(12) United States Patent
Dunstan

(10) Patent No.: US 7,411,314 B2
(45) Date of Patent: Aug. 12, 2008

(54) AUTOMATIC SHUT OFF OF BACKUP POWER SOURCE IN THE EXTENDED ABSENCE OF AC POWER

(76) Inventor: Robert A. Dunstan, 53489 NW. Wilson School Rd., Forest Grove, OR (US) 97116

(*) Notice: Subject to any disclaimer, the term of this patent is extended or adjusted under 35 U.S.C. 154(b) by 415 days.

(21) Appl. No.: 10/644,683

(22) Filed: Aug. 19, 2003

(65) Prior Publication Data

US 2005/0041351 A1 Feb. 24, 2005

(51) Int. Cl.
*H02J 7/00* (2006.01)
*G06F 11/00* (2006.01)

(52) U.S. Cl. ............................ 307/64; 714/24
(58) Field of Classification Search ............ 307/66, 307/64; 714/24
See application file for complete search history.

(56) References Cited

U.S. PATENT DOCUMENTS

| | | | | |
|---|---|---|---|---|
| 4,684,945 A | * | 8/1987 | Sanderford, Jr. | 340/825.56 |
| 5,162,664 A | * | 11/1992 | Haun et al. | 307/64 |
| 5,307,318 A | * | 4/1994 | Nemoto | 365/226 |
| 5,831,347 A | * | 11/1998 | Landis et al. | 307/64 |
| 5,854,904 A | * | 12/1998 | Brown | 710/100 |
| 6,078,595 A | * | 6/2000 | Jones et al. | 370/503 |
| 6,204,573 B1 | * | 3/2001 | Green et al. | 307/66 |
| 6,274,949 B1 | * | 8/2001 | Lioux et al. | 307/64 |
| 6,462,507 B2 | * | 10/2002 | Fisher, Jr. | 320/101 |
| 6,509,657 B1 | * | 1/2003 | Wong et al. | 307/66 |
| 6,601,181 B1 | * | 7/2003 | Thomas | 713/340 |
| 6,954,864 B2 | * | 10/2005 | Schelling | 713/310 |
| 7,047,431 B2 | * | 5/2006 | Suzuki | 713/340 |
| 7,131,011 B2 | * | 10/2006 | Westerinen et al. | 713/300 |
| 2002/0089233 A1 | * | 7/2002 | Nakamura | 307/43 |
| 2002/0143410 A1 | * | 10/2002 | Yance et al. | 700/11 |

OTHER PUBLICATIONS

"Advanced Configuration and Power Interface Specification," Compaq Computer Corporation, et al., Revision 2.0c, Oct. 30, 2003, pp. 26-44.

* cited by examiner

*Primary Examiner*—Michael J Sherry
*Assistant Examiner*—Michael Rutland Wallis
(74) *Attorney, Agent, or Firm*—Schwabe, Williamson & Wyatt, P.C.

(57) ABSTRACT

A system is provided with the ability to automatically shut off a backup power source from further sourcing power for the system, when AC is absent, after the backup power source has sourced power for the system for a period of time.

29 Claims, 6 Drawing Sheets

AUTOMATIC SHUT OFF OF BACKUP POWER SOURCE IN THE EXTENDED ABSENCE OF AC POWER

BACKGROUND

Advances in integrated circuits and microprocessor technologies have made possible the availability of computing devices, such as personal computers, with computing power that was once reserved for "main frames". As a result, increasingly computing devices, such as personal computers, are being used for a wide array of computations, and often, "important" computations.

However, computing devices, such as personal computers, are still being provided without integral backup power support. Further, unlike their server brethrens, typically, supplemental external backup power supports are seldom employed. Thus, whenever the power supply fails, these computing devices go into an un-powered state, and the system states are lost.

For those computing devices endowed with power management implemented in accordance with the Advanced Configuration and Power Interface (ACPI) (jointly developed by Hewlett Packard, Intel, et al), the computing devices are said to be in the "un-powered" G3 state.

Moreover, when power is restored, and a user presses the power button of the computing device, the user typically gets a number of messages from the operating system (OS) of the computing device. Unfortunately, many of these messages are understood by sophisticated users only. Examples of these messages include asking the user whether the user desires to boot the computing device into a safe mode, have the disk drive scanned, and so forth.

If acceptance of computing devices, such as personal computers, is to continue to expand, and the computing devices are to be used by more and more users for an increasing variety of applications, such as "entertainment" applications, it is necessary for their usability, availability, and/or reliability to continue to improve. Further, it is necessary for the usability, availability, and/or reliability to be improved cost effectively.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to method for shutting DC power source off, BIOS and/or chipset equipped to facilitate practice of the method, power supply with DC power source that may be shut off, and components, circuit boards or devices endowed with the BIOS, chipset and/or power supply.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
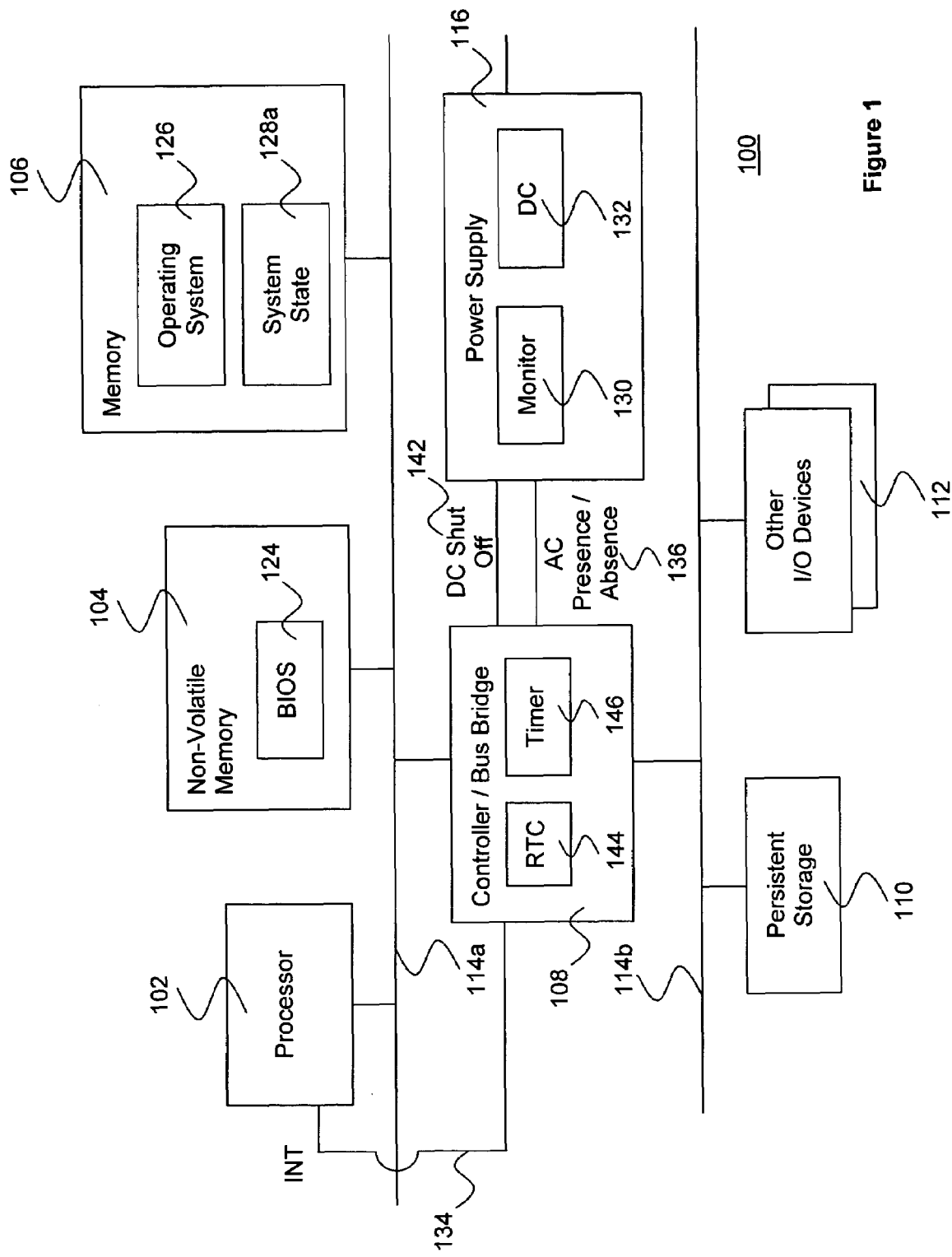
FIG. 1 illustrates an overview of a system incorporated with the teachings of embodiments of the present invention, including a power supply having a backup power source and an arrangement to shut off the backup power source after drawing on the backup power source for a period of time.

Referring now to FIG. 1 wherein an overview of a system incorporated with the teachings of one embodiment of the present invention is illustrated. For the embodiment, system 100 includes processor 102, non-volatile memory 104, memory 106, controller/bus bridge 108, persistent storage 110, other I/O devices 112, buses 114*a*-114*b*, and power supply 116, coupled to each other as shown. Controller/bus bridge 108 is also referred to as memory and I/O controller/bus bridge (MCH/ICH/BB) 108.

Non-volatile memory 104 includes in particular basic input/output system (BIOS) 124 incorporated with the teachings of one embodiment of the present invention. Memory 106 includes a working copy of operating system (OS) 126 and system state data 128*a*. The term "system state" as used herein includes OS and application states and data. MCH/ICH/BB 108 is equipped to interrupt processor 102, when system 100 is in an active state and an AC failed or absent condition arises. More specifically, for the embodiment, the interrupt is issued by the ICH portion of MCH/ICH/BB 108. MCH/ICH/BB 108 is further equipped to facilitate OS 126 to cause system 100 to go into the "suspended to memory" state. Further, MCH/ICH/BB 108 is equipped to shut off delivery of "normal" power (leaving only standby power) to cause system 100 to go into a "suspended to memory" state. MCH/ICH/BB 108 is also equipped to process device wake events, including a notification of AC re-presence while system 100 is in a suspended to memory state. In particular, MCH/ICH/

BB 108 is equipped to allow resumption of delivery of "normal" power, initiate waking of system 100, and facilitate BIOS to initiate a resume process. Similarly, for the embodiment, processing of device wake events is performed at the ICH portion MCH/ICH/BB 108. [AC=Alternating Current.]

Power supply 116 includes integral backup DC power source 132, to source power for system 100 while system 100 is in an AC failed or absent condition, and a monitor 130 equipped to signal 136 presence or absence of AC power at power supply 116. An example of integral backup DC power source 132 is a battery. For the purpose of present application, the terms "AC failed" or "AC absence" should be considered synonymous, unless the context clearly indicates to the contrary. Hereinafter, integral backup DC power source 132 may also be simply referred to as either backup power source or DC power source. Further, in alternate embodiments backup power source may be a non-DC power source. [DC=Direct Current.]

Integral DC power source 132 includes in particular a switch (not shown) and interface to shut off integral DC power source 132 from sourcing power for system 100, especially after integral DC power 132 has been sourcing power for system 100 for a "prolonged" period of time, during absence of AC. Of course, what constitutes a "prolonged" period of time may be dependent on a number of factor, including but are not limited to the capacity of DC power source 132 and the "typical" draw rate on DC power source 132 during absence of AC.

Preferably, the period of time, after passing of which the DC power source 132 should be shut off, is specifiable to system 100. Such specification may be made in any one of a number of operational parameter specification manners.

Still referring to FIG. 1, MCH/ICH/BB 108 includes in particular real time clock 144 which may be employed to initiate waking of system 100 after the period of time, to facilitate shutting off of integral DC source of power 132 from sourcing power for system 100.

For the embodiment, MCH/ICH/BB 108 further includes a timer 146 and companion logic (not shown) to facilitate shutting off of integral DC source of power 132 from sourcing power for system 100 instead. In alternate embodiments, the timer and companion logic may be disposed in power supply 116 or other hardware element instead.

Resultantly, system 100 is prevented from drawing on the integral DC source of power 132 for an undesirable extended period of time. Accordingly, the capacity of integral DC source of power may be smaller, and less costly. Thus, system 100 may be provided with integral backup power, more specifically, integral DC backup power 132 in a more cost effective manner.

Further, when coupled with the ability to preserve an operational state of system 100 when it suspends to memory, the ability to deterministically shut off DC power source 132 enables system 100 to be more readily returned to a last known system state, according the user possibly a better usability experience.

Still referring to FIG. 1, except for teachings of embodiments of the present invention incorporated, processor 102, non-volatile memory 104, memory 106, MCH/ICH/BB 108, persistent storage 110, I/O devices 112, and buses 114*a*-114*b* all represent corresponding broad ranges of these elements. In particular, an example of an I/O device is a networking interface. Similarly, except for the teachings of present invention, BIOS 124 and OS 126 also represent corresponding broad ranges of the elements. In various embodiments, MCH/ICH/BB 108 and/or other elements are packaged in the form of chipsets.

Various embodiments of these teachings incorporated in MCH/ICH/BB 108, power supply 116, BIOS 124, the operational states and various operational flows of system 100 will be described in turn below.

In various embodiments, system 100 may be a desktop computer, a set-top box, an entertainment control console, a video recorder, or a video player.

Further, alternate embodiments may be practiced without some of the enumerated elements or with other elements. In particular, alternate embodiments may be practiced without DC power source 132 being an integral part of system 100. That is, for these embodiments, DC power is provided from a source external to system 100.

Figure 2A:
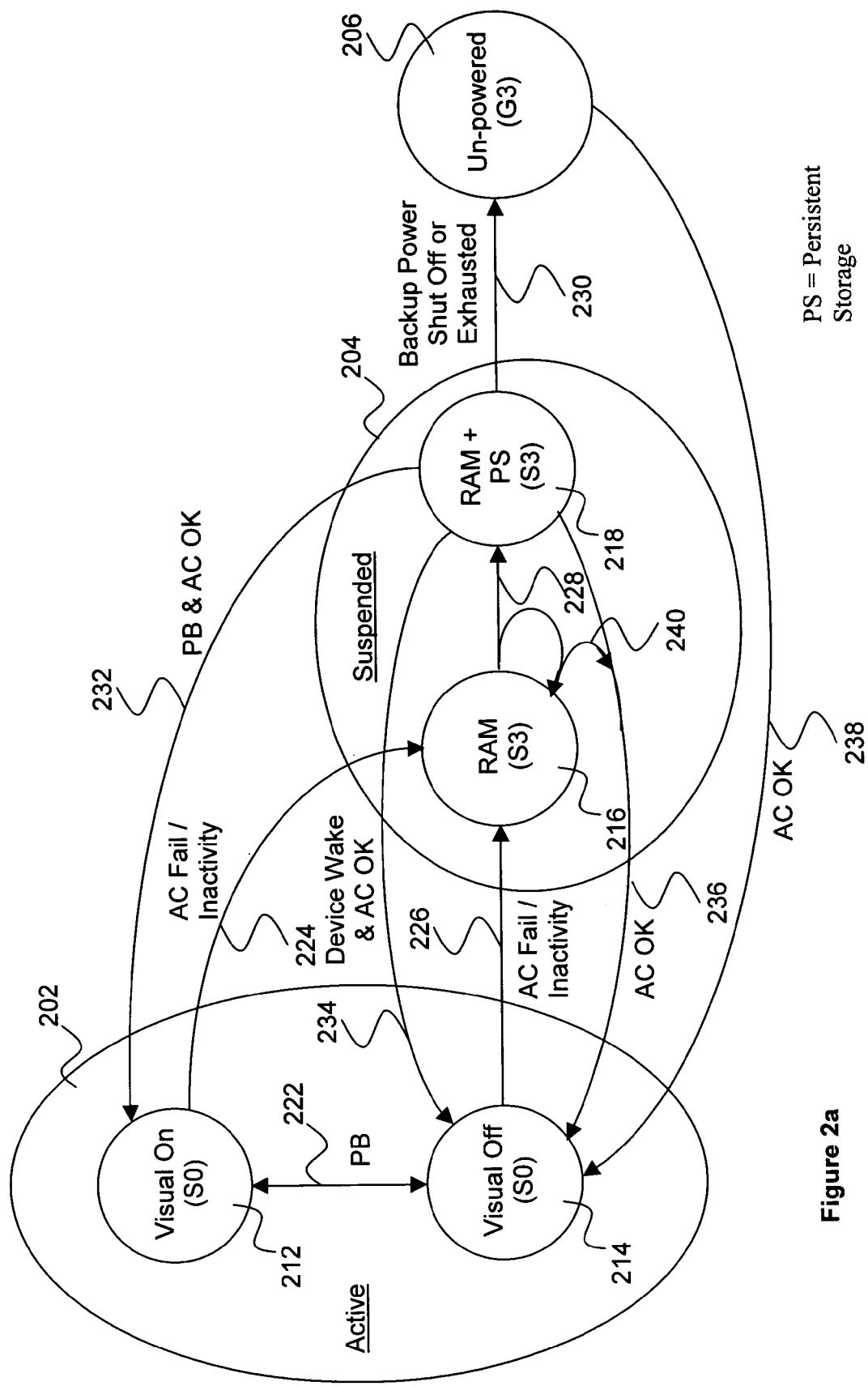
FIG. 2*a* illustrates the operational states of the system of FIG. 1, in accordance with one embodiment.

FIG. 2*a* illustrates one embodiment of the operational states of system 100. For ease of understanding, the operational states will be described assuming system 100 also includes implementation of ACPI, and mapped to the ACPI states. For the embodiment, the operational states of system 100 include three major operational states, active state (ACPI S0 or simply, S0) 202, suspended state (ACPI S3 or simply, S3) 204 and un-powered state (ACPI G3 or simply G3) 206. However, alternate embodiments may be practiced without mapping to ACPI states or implementation of ACPI. For further information on ACPI including ACPI states, see The ACPI Specification, Revision 2.0b.

Within active state (S0) 202, system 100 may be in "visual on" state 212, or "visual off" state 214. While system 100 is in "visual on" state 212, user perceptible indications of system activity may be selectively activated as appropriate, including but are not limited to display devices, light emitting diodes (LEDs), speakers, and so forth. On the other end, while system 100 is in "visual off" state 214, all visual and aural elements of system 100 are "off", giving a user the impression that system 100 has been "turned off". As illustrated, system 100 may transition between "visual on" state 212 and "visual off" state 214 based at least in part on power button (PB) events 222.

Having visual "on" and "off" states 212 and 214 within active state (S0) 202 is a non-essential aspect of the disclosed embodiments of the present invention. The feature is the subject matter of co-pending U.S. patent application, Ser. No. 10/644,978, entitled Method, Apparatus and System for Operating Data Processing Devices, and filed contemporaneously. For further details, see the co-pending application.

Still referring to FIG. 2*a*, for the embodiment, within suspended state (S3) 204, system 100 may be in "suspended to memory" state 216 or "suspended to memory with a persistent copy of the system state saved" state 218. System 100 may enter into "suspended to memory" state 216 from either "visual on" state 202 or "visual off" state 204, due to e.g. "inactivity", user instruction, or an "AC failure" condition, 224 and 226. System 100 is considered to be in the "AC failure" condition, whenever AC is not present at power supply 116.

Additionally, for the embodiment, as part of the entry into the "suspended to memory" state 216, a persistent copy of the then system state is saved, resulting in system 100 automatically transitions from "suspended to memory" state 216 to "suspended to memory with a persistent copy of the system state saved" state 218.

Automatic saving of a persistent copy of the then system state is also not an essential aspect of the disclosed embodiments of the present invention. The feature is the subject matter of co-pending U.S. patent application Ser. No. 10/644, 432 entitled "Operational State Preservation in the Absence of AC Power", and filed contemporaneously. For further details, see the co-pending application.

From "suspended to memory with a persistent copy of the system state saved" state 218, system 100 enters un-powered state (G3) 206 if the integral DC power source is shut off or exhausted 230. The feature of shutting off the DC power source off to prevent it from being exhausted will be further described below.

From "suspended to memory with a persistent copy of system state saved" state 218, system 100 may transition back to either "visual on" state 212 or "visual off" state 214 in response to AC re-presence, or a power button/device wake event 232/234 if AC is present (state 218 entered due to inactivity). In various embodiments, the latter transitions are permitted only if AC is present at power supply 116, else the power button or device wake events are suppressed or ignored.

Suppressing or ignoring power button and device wake events when AC is absent, is also not an essential aspect of the disclosed embodiments of the present invention. The feature is the subject matter of co-pending U.S. patent application Ser. No. 10/644,628, entitled "Power button and Device wake events Processing Methods in the Absence of AC Power", and filed contemporaneously.

Further, system 100 returns to "visual off" state 214 if AC becomes present again while system 100 is in "un-powered" state (G3) 206.

Figure 2B:
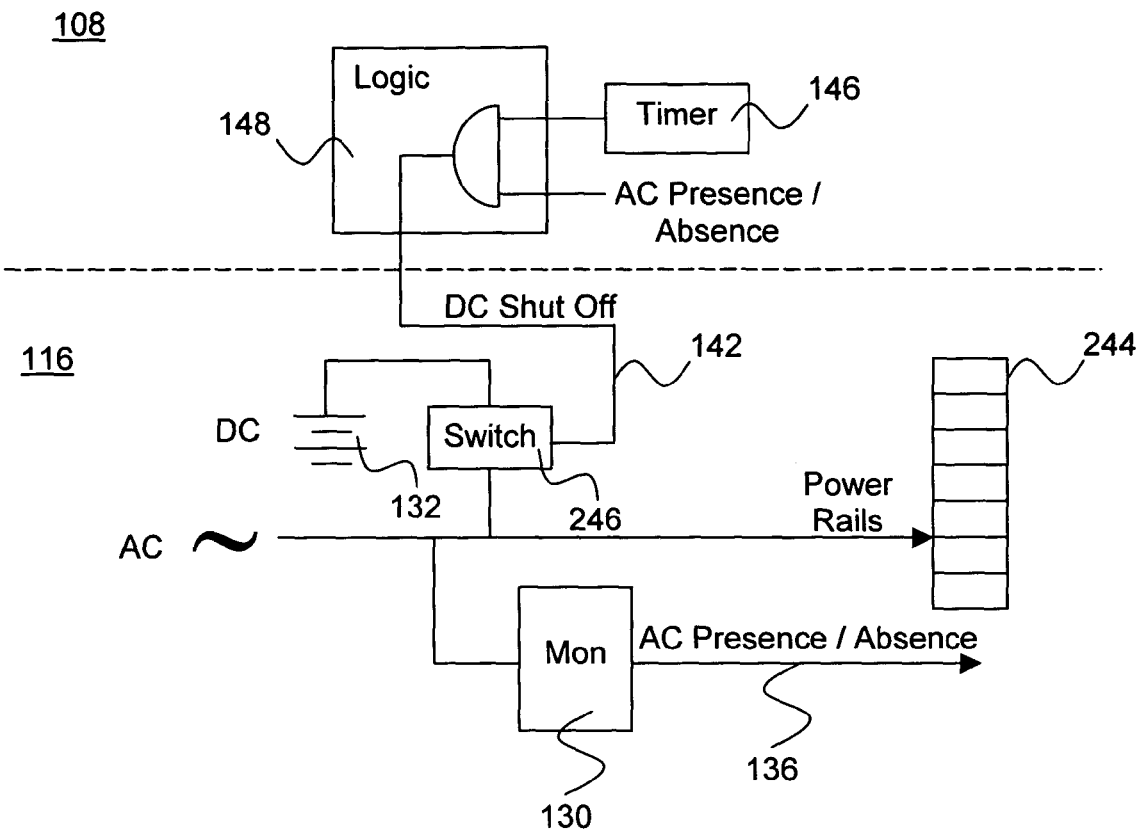
FIG. 2*b* illustrates embodiments of the power supply of FIG. 1 in further details, including an interface to shut off the backup power source.

Referring now to FIG. 2b, wherein one embodiment of power supply 116 is illustrated. As shown, for the embodiment, power supply 116 includes integral backup DC power source 132, monitor 130 and switch 246, as described earlier. Additionally, for the embodiment, power supply 116 includes multiple power outputs (also referred to as power rail) 244. The elements are coupled to each other as shown.

For the embodiment, switch 246 is coupled to timer 146 and its companion logic 148 of MCH/ICH/BB 108 as shown. Thus, it can be seen, in alternate embodiments, timer 146 and companion logic 148 may be disposed in power supply 116 instead.

Accordingly, power outputs 244 may continue to supply power to elements of system 100, drawing on integral DC power source 132, in the absence of AC at power supply 116. However, the sourcing of power by DC power supply 132 may be shut off by turning off switch 246, preventing DC power supply 132 from being exhausted, especially during prolonged absence of AC.

Further, monitor 130 is able to output a signal denoting whether AC is present or absent at power supply 116 at any point in time.

Additionally, timer 146 may be employed to generate a timing signal denoting expiration of the period of time, beyond which DC power source 132 should not be drawn on. Companion logic 148 enables one or more additional factors to be taken into consideration before actually generating the shut off signal. An example of such factors is whether AC has returned.

In various embodiments, the additional qualification of the generation of the shut off signal may not have to be practiced. For example, DC power source 132 is either explicitly or implicitly shut off on presence of AC, and further shutting it off would not cause the source of power to be "flipped" to DC power source 132, rendering the consideration unnecessary. Further, BIOS 124 may be equipped to cancel a setting of timer 146, when it resumes system 100 into an active state on return of AC power, thus ensuring expiration of timer 146 occurs only in the context of absence of AC.

In various embodiments, DC power source 132 may be a battery. Monitor 130 may be implemented employing a diode and RC coupled to a comparator to provide signal 136. Further, a logical "1" of signal 136 denotes AC present at power supply 116, whereas a logical "0" of signal 136 denotes AC absent at power supply 116.

In various embodiments, power outputs 244 may include normal and standby power outputs. Normal power outputs may include +12 v, +5 v, +3 v, and −12 v, whereas standby power output may include +5 v. Further, the normal power outputs may be turned off.

Figure 2C:
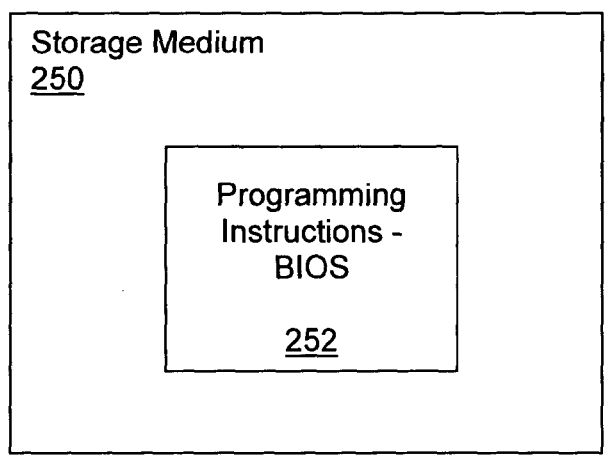
FIG. 2*c* illustrates an example article having programming instructions implementing all or the relevant portions of the BIOS of FIG. 1 to shut off the backup power source, in accordance with one embodiment.

FIG. 2c illustrates an example article having programming instructions implementing all or the relevant portions of BIOS 124 of FIG. 1, in accordance with one embodiment. As illustrated, article 250 includes a storage medium 252 and programming instructions 252 implementing all or the relevant portions of BIOS 124 of FIG. 1. As alluded to earlier and to be described in more detail below, BIOS 124 includes teachings of at least one embodiment of the present invention to facilitate shutting off DC power source 132.

For the embodiment, article 250 may be a diskette. In alternate embodiments, article 250 may be a compact disk (CD), a digital versatile disk (DVD), a tape, a compact Flash, or other removable storage device of the like, as well as a mass storage device, such as a hard disk drive, accessible for downloading all or the relevant portions of BIOS 124 via e.g. a networking connection.

Figure 3:
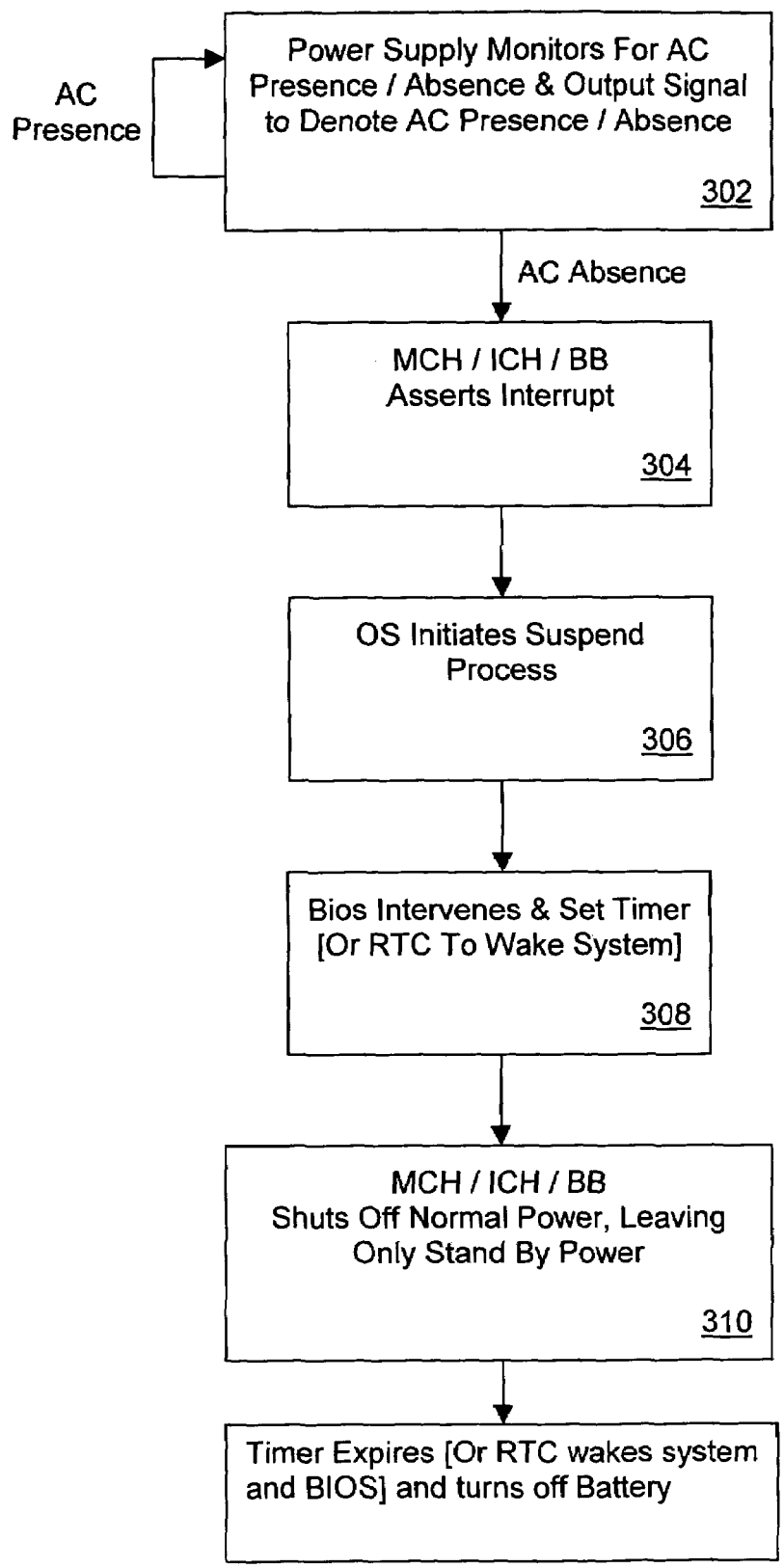
FIG. 3 illustrates embodiments of the relevant operation flow of the system to suspend the system to memory in responding to an AC failure condition, while operating in an active state, including the BIOS intervening to set up the system to shut off the backup power source after a period of time.

FIG. 3 illustrates one embodiment of the relevant operation flow of system 100 to suspend system 100 to memory in responding to an AC failure condition, while operating in active state 202, including BIOS 124 setting up system 100 to shut off DC power source after sourcing power for system 100 for a period of time.

As illustrated, while operating in active state 202, power supply 116 monitors for AC presence or absence, and outputs a signal to denote AC presence or absence accordingly, block 302. In alternate embodiments, the monitoring and signaling of AC presence or absence at power supply 116 may be performed by another element other than power supply 116. Regardless, the monitoring and signaling continues as long as AC is present at power supply 116.

However, when AC fails or absent from power supply 116, and monitor 130 outputs a signal so denoting, for the embodiment, MCH/ICH/BB 108 asserts an interrupt, block 304, notifying processor 102 to switch execution to a portion of OS 126 (interrupt handler) to place system 100 in a suspended state, block 306.

In various embodiments, the suspend process involves OS 126 writing to a special register of MCH/ICH/BB 108 with data so denoting. Further, MCH/ICH/BB 108, e.g. the ICH portion is equipped, and initialized to generate an interrupt (e.g. a System Management Interrupt (SMI), and transfer control to a designed interrupt handler of BIOS 124 in response to the OS write.

As a result, BIOS 124 is able to intervene in the suspend process. More specifically, in various embodiments, BIOS 124 intervenes to set system 100 up to shut off DC power source 132 at the passage of a time period, block 308. The time period is the application dependent period beyond which drawing on DC power source 132 is no longer desirable, and as described earlier, in some embodiments, may be specified to system 100.

In various embodiments, BIOS 124 sets system 100 up to shut off DC power source 132 at the passage of a time period, by scheduling RTC to initiate waking system 100 up at the end of the time period. In other embodiments, BIOS 124 sets system 100 up to shut off DC power source 132 at the passage of a time period, by setting a timer, such as timer 146, to expire at the end of the time period.

In various embodiments, BIOS 124 may be further equipped with the ability to save a persistent copy of the then system state in a persistent storage device, such as a hard disk drive. However, this is not an essential aspect of the disclosed embodiments of the present invention. It is the subject matter of the above-identified co-pending U.S. patent application Ser. No. 10/644,432.

Upon setting up system 100 (and optionally saving a persistent copy of the operational state system 100), BIOS 124 causes the suspend process to continue (e.g. completing the OS attempted write to the special register).

In various embodiments, the suspend process continues with MCH/ICH/BB 108 turning off the delivery of all normal power within system 100, except for the delivery of standby power to one or more selected elements of system 100, e.g. memory 106, block 310.

Figure 4:
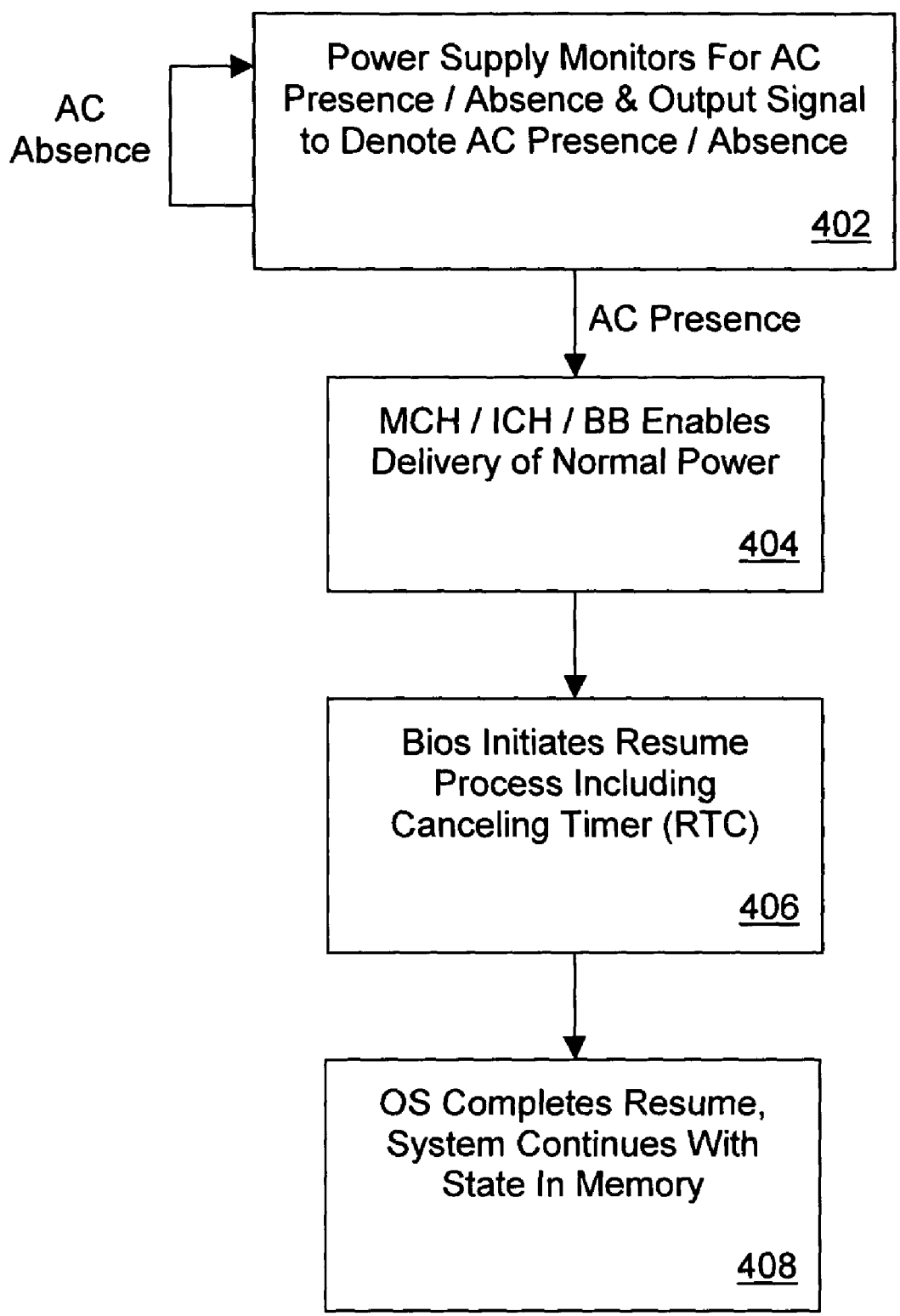
FIG. 4 illustrates embodiments of the relevant operation flow of the system to resume the system to an active state in responding to an AC re-presence condition, while operating in a suspended state, including the BIOS canceling previous set up to shut off the backup power source at a later time.

FIG. 4 illustrates one embodiment the relevant operation flow of system 100 to transition system 100 to an active state, in responding to an AC re-presence condition, while operating in a suspended state, including cancellation of a prior system set up to shut off DC power source 132 at a later point in time. Recall from earlier description, for the embodiment, system 100 is in a suspended to memory state 204, more specifically, "suspended to memory with a persistent copy of the system state saved" state 218. However, as described earlier, alternate embodiments may be practiced without the support for intervening in a suspend to memory process, and saving a persistent copy of the operational state of system 100.

As illustrated, for the embodiment, power supply 116 monitors for AC presence or absence and outputs a signal to denote AC presence or absence accordingly, while operating in state 218, block 402. Again, as described earlier, in alternate embodiments, the monitoring and signaling of AC presence or absence at power supply 116 may be performed by another element other than power supply 116. Regardless, the monitoring and signaling continues as long as AC is absent at power supply 116.

However, when AC is re-present at power supply 116, and monitor 130 outputs signal 136 so denoting. For the embodiment, MCH/ICH/BB 108 responds to signal 136 as a device wake event, re-enabling delivery of normal power outputs of power supply 116 to elements of system 100, and then transfers control to BIOS 124, block 404. As described earlier, in various embodiments, the device wake event is processed by the ICH portion of MCH/ICH/BB 108.

At block 406, BIOS 124 performs various initializations of hardware elements as appropriate, including in particular, determining the cause of the device wake event. On determining the cause of the device wake event being AC re-represent, in various embodiments, BIOS 124 further cancels a prior set up to shut off DC power source 132 at a later point in time.

For an RTC embodiment, BIOS 124 cancels the scheduled wake up with RTC. For a timer embodiment (regardless of the disposition of the timer), BIOS 124 cancels the timer previously set up to automatically shut off DC power source 132.

Thereafter, BIOS 124 transfers control to a resume vector previously set up by OS 126 (as part of the suspend to memory process).

At block 408, OS 126 completes the resume process, and system 100 continues operation, starting from the previously suspended system state in memory 106.

As described earlier, alternate RTC embodiments may be practiced without canceling the scheduled wake up, but ignores, suppresses, overrides or otherwise renders the waking to shut off DC power source 132 ineffective at the later point in time, as system 100 would have been already awaken.

Similarly, alternate timer embodiments may be practiced without canceling the timer set, but ignores, suppresses, overrides or otherwise renders the expiration of the timer to shut off DC power source 132 ineffective at the later point in time.

Figure 5A:
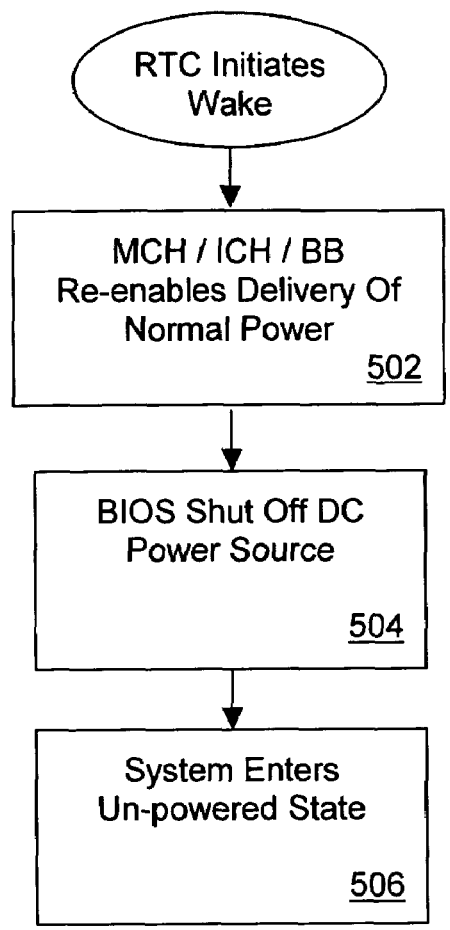
FIGS. 5*a*-5*b* illustrate embodiments of the relevant operation flow of the system in shutting off the backup power source.

FIG. 5a illustrates the relevant operational flow of system 100 in response to the scheduled wake up by RTC, in accordance with one embodiment. As illustrated, in response to a scheduled wake up by RTC, similar to the process earlier described for processing AC re-presence as a wake up event, MCH/ICH/BB 108 re-enables normal power delivery within system 100, and then transfers control to BIOS 124 to wake system 100, block 502.

At block 504, BIOS 124 performs various initializations of hardware elements as appropriate, including in particular, determining the cause of the device wake event. On determining the cause of the device wake event being a scheduled wake up with RTC, instead of completing the wake up process and transitioning system 100 from suspended state 218 into an active state 202, BIOS 124 causes DC power source 132 to be shut off. As a result, system 100 transitions from suspended state 218 to un-powered state (G3) 206 instead, block 506.

In various embodiments, BIOS 124 effectuates the shut off through the ICH portion of MCH/ICH/BB 108.

Figure 5B:
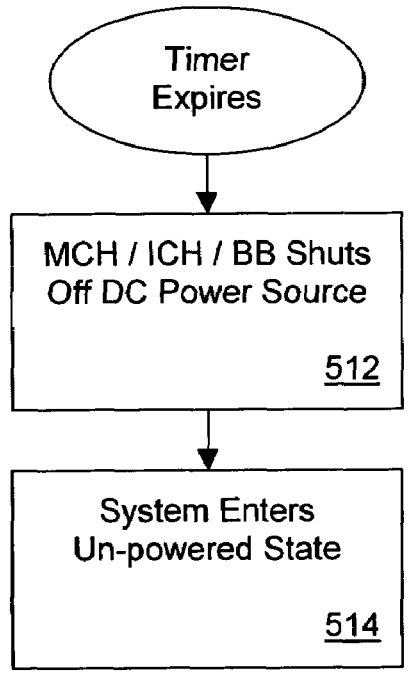

FIG. 5b illustrates the relevant operational flow of system 100 in response to the expiration of the timer set as part of the suspend process, in accordance with one embodiment. As illustrated, in response to the expiration of the timer set as part of the suspend process, MCH/ICH/BB 108 or power supply 116 (depends on the embodiment) outputs a signal turning off switch 206, block 512.

As a result, integral backup DC power 132 is shut off, and prevented from sourcing power for system 100. In turn, system 100 enters un-powered state 206, block 514.

Thus, it can be seen from the above description, a method to conserve power, in particular, integral DC backup power, in the absence of AC has been described. As described earlier, the feature is particularly useful in enabling integral DC backup power to be provided to a computing device in a more cost effective manner. Further, in various implementations, it enables the computing device to be more readily returned to a last known state.

While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. In an apparatus, a method of operation comprising:

powering the apparatus from a backup power source, in response to the apparatus being in an AC absence condition;

initiating, by an Operating System of the apparatus in response to the apparatus being in the AC absence condition, a suspend to memory process to place the apparatus in a suspended to memory state wherein an operational state of the apparatus is saved to volatile memory requiring a source of electrical power to sustain the suspended to memory state, and wherein no further activity occurs while the apparatus is in the suspended to memory state including suspension of all data transmissions;

setting, by a BIOS of the apparatus upon the initiation of the suspend to memory process, a timer to initiate waking up of the apparatus after a period of time and to facilitate shutting off the backup power source; and canceling, by the BIOS, the timer as part of a resume process initiated in response to AC power being re-present at the apparatus.

2. The method of claim 1, wherein the timer is a real time clock (RTC) to initiate waking of the apparatus after the period of time, to facilitate the shutting off of the backup power source.

3. The method of claim 2, wherein the basic input/output system (BIOS) is adapted to schedule the RTC to initiate waking of the apparatus after the period of time.

4. The method of claim 2, wherein the method further comprises the RTC initiating waking of the apparatus, after passing of the period of time, including as part of waking of the apparatus, a basic input/output system (BIOS) causing the backup power source to be shut off, transitioning the apparatus to an un-powered state instead.

5. The method of claim 4, wherein the BIOS causes the backup power source to be shut off as part of the waking of the apparatus if AC remains absent.

6. The method of claim 1, wherein the method further comprises
the timer expiring after passing of the period of time; and
a companion logic of the timer shutting off of the backup power source, placing the apparatus in an un-powered state.

7. The method of claim 6, wherein the timer shuts off the backup power source if AC remains absent.

8. The method of claim 1, wherein the method further comprises
monitoring for absence of AC to the power supply; and
generating a signal indicating AC absence on detection of absence of AC to the power supply.

9. The method of claim 8, wherein the monitoring and generating are performed by the power supply.

10. The method of claim 1, wherein the method further comprises accepting by the apparatus a specification of the period of time.

11. A system comprising:
a power supply to supply power to the system, including a backup power source to supply power during absence of AC to the power supply; and
an arrangement coupled to the power supply to shut off the power supply, after initiating, by an Operating System of the apparatus in response to the apparatus being in an AC absence condition, a suspend to memory process to place the system in a suspended to memory state wherein an operational state of the apparatus is saved to volatile memory requiring a source of electrical power to sustain the suspended to memory state, and wherein no further activity occurs while the system is in the suspended to memory state including suspension of all data transmissions, and after the expiration of a timer set, by a BIOS of the apparatus upon the initiation of the suspend to memory process, to expire after a period of time, the BIOS adapted to cancel the timer as part of a resume process to place the system in an active state in response to AC power re-presence.

12. The system of claim 11, wherein the arrangement comprises a real time clock (RTC) employable to initiate waking of the system after the period of time, to facilitate shutting off of the backup power source.

13. The system of claim 12, wherein the basic I/O system (BIOS) is adapted to schedule the RTC to initiate waking of the system after the period of time.

14. The system of claim 12, wherein the basic I/O system (BIOS) equipped to cause the backup power source to be shut off when the RTC initiates waking of the system.

15. The system of claim 13, wherein the BIOS is further equipped to cause the backup power source to be shut off if AC remains absent.

16. The system of claim 11, wherein the system further comprises a circuit coupled to the timer to generate a shut off signal to shut off the backup power off, at the expiration of the timer.

17. The system of claim 16, wherein the circuit is further equipped to receive a AC condition signal indicating whether AC presence or absence, and condition the generation of the shut off signal based on the AC condition signal.

18. The system of claim 11 wherein the system further comprises a controller to control at least a selected one of an input and an output of the system, and the timer is a part of the controller.

19. The system of claim 11, wherein the timer is a part of the power supply.

20. The system of claim 11, wherein the arrangement is further equipped to accept for the system a specification of the period of time.

21. The system of claim 11, wherein the system further comprises a networking interface.

22. A power supply comprising:
an output interface;
a backup power source; and
a switch conditionally coupling the integral backup power source to the output interface to output power through the output interface during absence of AC to the power supply, including a control interface accessible during a suspended to memory state of a host device hosting the power supply to allow the backup power source to be uncoupled from the output interface to stop the backup power source from outputting power through the output interface after the host device has entered the suspended to memory state, during which state no data are transmitted, said suspended to memory state initiated by an Operating System of the host device in response to the AC absence condition and wherein an operational state of the host device is saved to volatile memory requiring a source of electrical power to sustain the suspended to memory state and further after the expiration of a timer set, by a BIOS of the host device upon the initiation of the suspended to memory process, to expire after a period of time, the BIOS adapted to cancel the timer as part of a resume process to place the system in an active state in response to AC power re-presence.

23. The power supply of claim 22, wherein the power supply further comprises a monitor to monitor for presence or absence of AC to the power supply, and to generate a signal indicating the presence or absence of AC accordingly.

24. The power supply of claim 22, wherein the power supply further comprises a timer settable to expire after the period of time to shut off the backup power source.

25. An article of manufacture comprising:
a storage medium;
a plurality of programming instruction stored therein, designed to enable an apparatus to be able to perform, when the apparatus is in an AC absence condition;
setting a real time clock (RTC) to initiate waking of the apparatus after the apparatus has been placed into a suspended to memory state initiated by an Operating System of the apparatus in response to the AC absence condition, under which state no data are transmitted, and wherein an operational state of the apparatus is saved to volatile memory requiring a source of electrical power to sustain the suspended to memory state and to shut off a backup power source of the apparatus upon the expiration of a timer set, upon the initiation of the suspend to memory process, to expire after a period of time; and cancel the timer as part of a resume process to put the apparatus in an active state initiated in response to AC power being re-present at the apparatus.

26. The article of claim 25, wherein the programming instructions are further designed to enable the apparatus to perform the setting operation, when intervening in a process to suspend the apparatus.

27. The article of claim 25, wherein the programming instructions are further designed to enable the apparatus to shut off the backup power source when the RTC initiates waking of the apparatus after passing of the time period.

28. The article of claim 27, wherein the programming instructions are further designed to enable the apparatus to perform the shut off conditioned on AC remains absent at the apparatus.

29. The article of claim 25, wherein the programming instructions implement the enabling of the apparatus to perform f the setting operation as part of the basic input/output system (BIOS).

* * * * *